(12) United States Patent
Kao (10) Patent No.: US 12,517,118 B2
(45) Date of Patent: Jan. 6, 2026

(54) SENSING CHIP WITH FLUIDIC DEVICE (71) Applicant: Hsi-Teng Kao, Hsinchu (TW)

(72) Inventor: Hsi-Teng Kao, Hsinchu (TW)

( * ) Notice: Subject to any disclaimer, the term of this patent is extended or adjusted under 35 U.S.C. 154(b) by 854 days.

(21) Appl. No.: 17/845,504

(22) Filed: Jun. 21, 2022

(65) Prior Publication Data
US 2022/0404345 A1 Dec. 22, 2022

(30) Foreign Application Priority Data

Jun. 22, 2021 (TW) .................................. 110122708
Mar. 11, 2022 (TW) .................................. 111109041

(51) Int. Cl.
*G01N 33/543* (2006.01)
*B01L 3/00* (2006.01)
*G01N 27/414* (2006.01)
*G01N 33/569* (2006.01)

(52) U.S. Cl.
CPC .... *G01N 33/5438* (2013.01); *B01L 3/502715* (2013.01); *G01N 27/4141* (2013.01); *G01N 27/4145* (2013.01); *G01N 27/4148* (2013.01); *G01N 33/56916* (2013.01); *B01L 2300/0645* (2013.01); *B01L 2300/18* (2013.01)

(58) Field of Classification Search
CPC ........... G01N 33/5438; G01N 27/4141; G01N 27/4145; G01N 27/4148; G01N 33/56916; G01N 27/307; G01N 27/3275; B01L 3/502715; B01L 2300/0645; B01L 2300/18
See application file for complete search history.

(56) References Cited

FOREIGN PATENT DOCUMENTS

WO WO-2020252565 A1 * 12/2020 ............. H10D 30/68

* cited by examiner

*Primary Examiner* — Dennis White
(74) *Attorney, Agent, or Firm* — Muncy, Geissler, Olds & Lowe, P.C.

(57) ABSTRACT

A sensing chip with fluidic device includes a substrate with a first area and a second area, a field effect transistor is arranged in the second area of the substrate and is electrically connected with the field effect transistor. The fluidic device includes an insulation layer with a window to expose the surface of substrate in the second area. A second gate electrode is arranged in the window of the isolation layer on the second area of the substrate. The sample is placed in the fluidic device to contact with the second gate electrode, and the receptor(s) on the metal layer will capture the target object in the sample, so the voltage of the metal layer will change with amount of the target object captured by the receptor(s). Thus, the concentration of the target object(s) in the sample may obtain by the changes of the voltage of the metal layer.

14 Claims, 9 Drawing Sheets

SENSING CHIP WITH FLUIDIC DEVICE

CROSS-REFERENCE TO RELATED APPLICATIONS

This application claims the benefit of TW Application No. 110122708, filed Jun. 22, 2021, and TW Application No. 111109041, filed Mar. 11, 2022, which are incorporated in its entirety by reference herein.

FIELD OF THE INVENTION

The present invention relates to the technical field of detection, particularly relates to a sensing chip with fluidic device which can detect proteins, bacteria, viruses, and suspended particles.

BACKGROUND OF THE INVENTION

Biosensor is a device for sensing and detecting biomolecules based on the principles of electricity, electrochemistry, optics, and mechanical detection. The biosensor with a transistor(s) can electrically sense the charge, photonic and mechanical properties of biomolecules or biological entities. This detection behavior can be achieved through direct detection and induction, or through the reaction or interaction between specific reactants and biomolecules/biological entities. The biosensors can be manufactured by semiconductor process, can quickly convert electronic signals, and can be easily applied to integrated circuits (ICs) and micro electromechanical systems (MEMs).

A biochip is essentially a kind of micro laboratory, which can perform hundreds or thousands of biochemical reactions simultaneously. The biochip can detect special biomolecules to detect the properties, and calculate and process signals, and directly analyze data. Therefore, biochip enables the researcher(s) to quickly screen a larger number of biological analytes which can applied for various purpose such as disease diagnosis to detection of biochemical terrorist attacks. Advanced biochips utilize several biosensors alongside the fluidic channel for reaction integration, sensing, and sample management. Biological field-effect transistor or bio-organic field-effect transistor (BioFET) is biosensor containing transistors, which can electrically sense biomolecules or biological entities. Although BioFETs have advantages in many aspects, but there are some challenges in their manufacturing and/or operation. For example, based on the issue of compatibility with semiconductor process, biological limitations and/or limits, many challenges have risen in large scale integration (LSI) process, such as the integration of electronic signals and biological applications.

In addition, the biosensor chip of the prior art can only detect the presence/absence of bacteria, viruses or suspended particles, and the detection area is limited, and the concentration thereof cannot be estimated. In addition, the high-sensitivity nanowire(s) designed in the chip method are prone to noise interference, so that misjudgment is easy to occur, and the polycrystalline silicon of the nanowire(s) is exposed outside, which is a special process. However, most of wafer foundries are unwilling to provide special and customized processes to cooperate with production, so they cannot improve the yield and cannot produce effectively In addition, the polymerase chain reaction (PCR) needs to provide a long detection reaction time or needs to be labeled before it can be detected, and requires expensive equipment to operate, so the polymerase chain reaction cannot be popularized.

SUMMARY OF THE INVENTION

It is an object of this invention is to provide a sensing chip with fluidic device, which can be designed according to CMOS (complementary metal oxide semiconductor) process provided by the current wafer foundry.

It is an object of this invention is to detect the sample of liquid or gas by a sensing chip with fluidic device. In addition to quickly detecting the existence of the target object(s) in the sample, the sensing chip with fluidic device can also detect the concentration of the target object(s) in the sample.

It is an object of this invention is to detect the temperature-sensitive target object(s) by using sensing chip with fluidic device, a temperature control unit provides a temperature control signal to the sensing chip with fluidic device to heat and control the temperature of the sample on the sensing chip with fluidic device, so the kinetic energy or change decomposition of the target object(s) in the sample may be increased due to the temperature rise. The receptor(s) on the metal layer can effectively capture the target object(s), and by the changes of the voltage value is generated by the metal layer, the changes of amount or concentration of the target object(s) in the sample is measured at the preset temperature.

It is an object of this invention is to provide a sensing element with a plurality of sensing devices with fluidic devices by sub-area detection method, so the detection accuracy is improved by increasing the volume of the sample.

It is an object of this invention is to provide a plurality of sensing chip with fluidic device to construct a sensing element, according to the same or different materials of the receptors in the sensing chip with fluidic device to capture the same or multiple different target object(s) in the sample to save the detection time, the detection result(s) of one or more target object(s) can be obtained to provide subsequent judgment or evaluation.

According to the above objects, this invention provides a sensing chip with fluidic device, which includes a substrate having a first area and a second area; the field effect transistor is arranged on the first area of the substrate, the field effect transistor having a first gate electrode, a source electrode, and a drain electrode, and the first gate electrode is arranged between the source electrode and the drain electrode; and a fluidic device is arranged on the second area of the substrate and is electrically connected with the field effect transistor, in which the fluidic device includes an isolation layer having a window to expose the surface of the substrate in the second area, and a region enclosed by the window is an accommodating space; the second gate electrode is arranged in the window of the isolation layer and is disposed up from the substrate which includes a polysilicon layer and one or multiple metal layer(s) thereon; and a reference electrode is disposed on the second area of the substrate and adjacent to the second gate electrode, in which the sample is disposed in the accommodating space to contact the second gate electrode, a plurality of receptors on the metal layer is provided for capturing a plurality of target objects in the sample, the voltage value of the metal layer of the second gate electrode is changed with the amount of target object(s) captured by the plurality of receptors, and the second gate electrode transmits the changes of voltage value of the metal layer to an external processing unit through the field effect transistor to process the voltage value change to calculate the concentration of the plurality of target objects in the sample.

In a preferred embodiment of this invention, the reference electrode is used to provide a voltage required for contacting with the sample and to provide a voltage required for measuring the changes of the voltage value of the metal layer of the second gate electrode when the sample is disposed in the accommodating space.

According to above objects, this invention also provides another sensing chip with fluidic device, which includes a substrate having a first area and a second area; the field effect transistor is arranged in the first area of the substrate, the field effect transistor having a first gate electrode, a source electrode, and a drain electrode, and the first gate electrode is arranged between the source electrode and the drain electrode and is disposed on the substrate; and a fluidic device arranged in the second area of the substrate and is electrically connected with the field effect transistor. The fluidic device includes an isolation layer having a window to expose the surface of the substrate in the second area, and a region enclosed by the window is an accommodating space; the second gate electrode is arranged in the window of the isolation layer, and the structure of the second gate electrode on the substrate includes a polysilicon layer and one or multiple metal layer(s) thereon; and a reference electrode adjacent to the second gate electrode and is arranged on the second area of the substrate, the reference electrode is in contact with the sample, in which the sample is disposed in the accommodating space, the metal layer of the second gate electrode is in contact with the sample, one end of the polysilicon layer in the second gate electrode is grounded and the other end of the polysilicon layer is electrically connected with a temperature control unit, and the temperature control unit provides a temperature control signal to heat the sample in the accommodating space through the polysilicon layer and to regulate a temperature of the sample, so that when the temperature of the sample reaches a preset temperature, a plurality of receptors on the surface of the metal layer is provided for capturing the plurality of target objects in the sample, a voltage value of the metal layer of the second gate electrode is changed with the amount of plurality of target objects captured by the plurality of receptors, and the second gate electrode transmits the changes of voltage value of the metal layer to an external processing unit through the field effect transistor with a corresponding changes of current value, which is processed by the external processing unit to obtain the concentration values of the plurality of target object(s) in the sample corresponding to the changes of voltage value of the metal layer at the preset temperature.

In a preferred embodiment of this invention, the temperature control unit is a pulse width modulation (PWM) unit.

In a preferred embodiment of this invention, the preset temperature range is 50° C.-95° C.

According to the above objects, this invention provides another sensing chip with fluidic device, which includes a substrate having a first area and a second area; a field effect transistor is arranged in the first area of the substrate, the field effect transistor having a first gate electrode, a source electrode, and a drain electrode, and the first gate electrode is arranged between the source electrode and the drain electrode; and a fluidic device arranged in the second area of the substrate and is electrically connected with the field effect transistor, the fluidic device includes an isolation layer having a window to expose a surface of the substrate in the second area, and a region enclosed by the window is an accommodating space; a second gate electrode is arranged in the window of the isolation layer and the structure of second gate electrode on the substrate includes a polysilicon layer and one or multiple metal layer(s) thereon. Accordingly, when the sensing chip with the fluidic device is placed in the environment with the sample, and the sample flows over the second gate electrode of the fluidic device, a voltage is applied to the second gate electrode of the fluidic device, a plurality of charges is generated on the surface of the metal layer of the second gate electrode and the surface of the plurality of receptors, each charges on the metal layer is used to capture the plurality of target objects in the sample, and the voltage value of the metal layer of the second gate electrode is changed with the amount of the charges on the metal layer captures the amount of the plurality of target objects, and the second gate electrode is provided for transmitting the changes of the voltage value of the metal layer to an external processing unit through the field effect transistor for processing, and the external processing unit is provided for calculating to obtain the concentration of the plurality of target objects in the sample.

In a preferred embodiment of the invention, the charge is positive or negative.

In a preferred embodiment of the invention, the constant voltage applied to the second gate is less than 30 volts.

In a preferred embodiment of the invention, the sample is gas.

In a preferred embodiment of the invention, the target object is bacteria, viruses, suspended particles, or gas molecules.

DETAILED DESCRIPTION OF THE PREFERRED EMBODIMENT

Figure 1A:
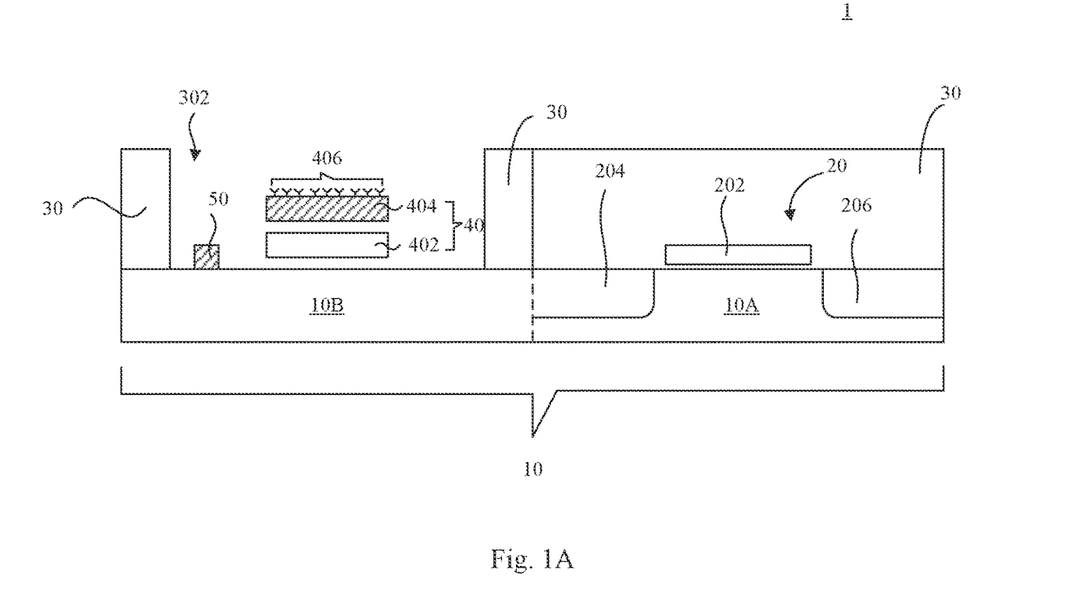
FIG. 1A is a schematic diagram showing an embodiment of a sensing chip with fluidic device in accordance with this invention.

Please refer to FIG. 1A. FIG. 1A is a schematic diagram showing a sensing chip with fluidic device. In FIG. 1A, a sensing chip with a fluidic device 1 is constructed by a field effect transistor (FET) 20 and a fluidic device. The sensing chip with fluidic device 1 includes a substrate 10, a dotted line on the substrate 10 is used to divide the substrate 10 into a first area 10A and a second area 10B. Herein, the substrate 10 is divided into the first area 10A and the second area 10B for easy understanding in the subsequent description, and there is no dotted line on the actual substrate 10. A field effect transistor 20 is arranged on the first area 10A of the substrate, in which the field effect transistor 20 may be an n-type metal oxide semiconductor (NMOS). The structure of field effect transistor 20 includes a gate electrode 202, a source electrode 204, and a drain electrode 206, in which the gate electrode 202 is disposed between the source electrode 204 and the drain electrode 206, and is arranged on the substrate 10, the source electrode 204 and the drain electrode 206 are disposed in the first area 10A of the substrate 10. The first area 10A of the substrate 10 further includes an isolation layer 30 (or may be referred to as a field oxide layer). It should be noted that the isolation layer 30, the gate electrode 202, the source electrode 204, and the drain electrode 206 are formed by using a suitable complementary metal oxide semiconductor (CMOS) process. The formation steps are not the main technical features of this invention, and it is not to be described here.

The fluidic device is arranged on the second area 10B of the substrate 10 and is electrically connected with the field effect transistor 20, in which the fluidic device includes an isolation layer 30, a second gate electrode 40, and a reference electrode 50. The isolation layer 30 has a window 302 to expose the surface of the substrate 10 in the second area 10B, and a region enclosed by the window 302 is an accommodating space. The second gate electrode 40 is arranged in the window 302 of the isolation layer 30, the structure of the second gate electrode 40 on the substrate 10 includes a polysilicon layer 402 and one or multiple metal layer(s) 404 thereon. A plurality of receptors 406 is disposed on the metal layer 404. In addition, a reference electrode 50 is arranged on the second area 10B of the substrate 10 adjacent to the second gate electrode 40. The reference electrode 50 is used to contacts with a sample 60 and to provide the voltage required for measuring the changes of the voltage value of the metal layer 404 of the second gate electrode 40.

Figure 1B:
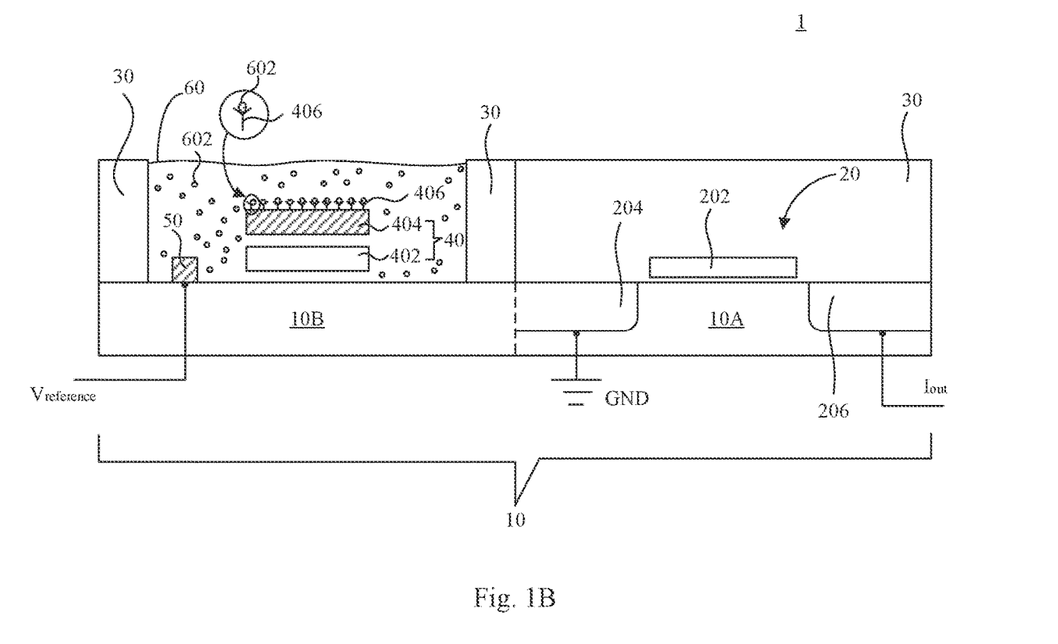
FIG. 1B is a schematic diagram showing a circuit layout of a sensing chip with fluidic device in accordance with this invention.

In this embodiment, the area enclosed by the window 302 of the isolation layer 30 on the second area 10B is used as an accommodating space to accommodate the sample 60 therein (as shown in FIG. 1B). Therefore, when the sample 60 is disposed in this accommodating space 302 to contact with the metal layer 404 of the second gate electrode 40 for a period, and then the changes of the voltage value of the metal layer 404 can be obtained, so the target object(s) 602 is whether in the sample and the concentration of target object(s) 602 in the sample 60 may be determined by the changes of voltage value. The detailed operation will be described later.

Next, please refer to FIG. 1B. FIG. 1B is a layout of a sensing chip with fluidic device. In FIG. 1B, the source electrode 204 of the field effect transistor 20 is grounded (GND), and the drain electrode 206 is electrically connected with an external processing unit (not shown). During operation, the sample 60 is disposed in the accommodating space 302 of the sensing chip with fluidic device 1, and the sample 60 is in contacted with a plurality of receptors 406 on the metal layer 404 of the second gate electrode 40 of the fluidic device and standing for at least 30 minutes. During the standing process, the plurality of receptors 406 is used to capture the plurality of target objects (or plurality of target molecules) 602 in the sample 60. It should be noted that the plurality of receptors 406 is immobilized on the metal layer 404 by antibody processing after the production of the sensing chip with fluidic device 1.

For example, the sample 60 can be BTP buffer, whole blood or plasma containing unknown target object(s) concentration. When the sample 60 is whole blood or plasma, the sample 60 is diluted with BTP buffer, and the diluted sample 60 is disposed in the accommodating space 302 of the fluidic device (as shown in FIG. 1A), that is, the position of the second gate electrode 40. The diluted sample 60 is kept for standing for a period. It should be noted that the standing period is not only to allow the metal layer 40 of the second gate electrode 40 to have sufficient time to contact with the sample 60, but also to allow the plurality of receptors 406 on the metal layer 404 to have sufficient time to capture the plurality of target objects 602 in the sample 60. When a plurality of receptors 406 on the surface of the metal layer 404 of the second gate electrode 40 capture the plurality of target objects 602 in the diluted sample 60, the voltage value of the metal layer 404 will change with the amount of the plurality of target objects 602 captured by the plurality of receptors 406, and then the current value changed by the metal layer 404 of the second gate electrode 40 (i.e. $I_{OUT}$ in FIG. 1B) is output to an external processing unit (not shown) through the field effect transistor 20 for processing to obtain the concentration value (or amount) of the plurality of target objects 602 in the diluted sample 60 corresponding to the voltage value of the metal layer 404. In this embodiment, the target object(s) 602 in the sample 60 may be an organism. When the sample 60 is a buffer solution, the target object(s) 602 in the buffer solution may be yeast, bacteria, virus, or protein, and when the sample 60 is plasma, the target object(s) 602 in the plasma may be a cell.

Figure 2:
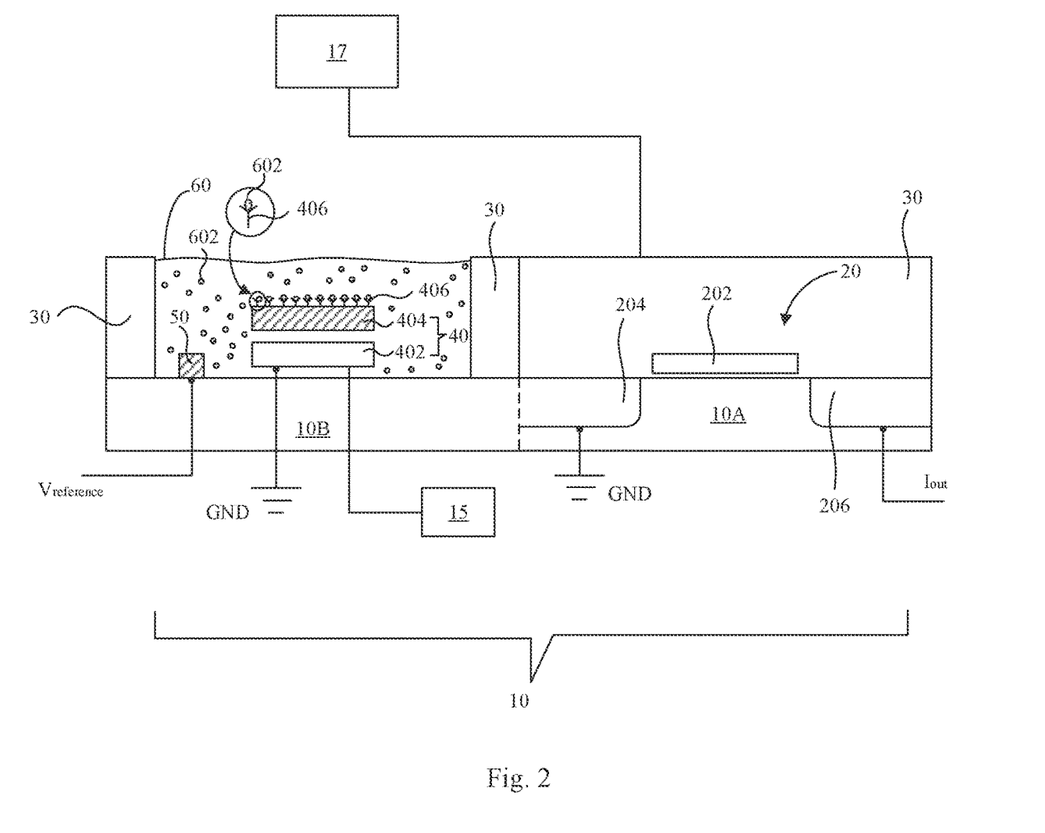
FIG. 2 is a schematic diagram showing another embodiment of a circuit layout of a sensing chip with fluidic device in accordance with this invention.

Next, please refer to FIG. 2. FIG. 2 shows a circuit layout of a sensing chip with a fluidic device. In FIG. 2, the structure, connection relationship and function of each element of the sensing chip with fluidic device 1 are the same as in FIG. 1A and FIG. 1B, and it is not to be described herein. The difference between FIG. 2 and FIG. 1A and FIG. 1B is that one end of the polysilicon layer 402 in the second gate electrode 40 is used for grounding (GND) (i.e., the left side of FIG. 2), the other end of the polysilicon layer 402 is electrically connected with a temperature control unit 15, and the sensing chip with fluidic device 1 is electrically connected with the temperature sensing circuit 17. In this embodiment, the temperature sensing circuit 17 is used to detect the temperature of the sensing chip with fluidic device 1, and the temperature control unit 15 is used to provide a temperature control signal and to regulate the width of the temperature control signal to control the temperature of the polysilicon layer 402, so the sample 60 in the accommodating space is heated by the temperature control signal. Since the kinetic energy of the plurality of target objects 602 in the sample 60 may increases due to the increase in temperature, the plurality of target objects 602 is more easily captured by the plurality of receptors 406 on the metal layer 404. The detailed detection steps are described below. In addition, the connection position between the grounding of the polysilicon layer 402 and temperature control unit 15 shown in FIG. 2 can be interchanged left and right.

First, the sample 60 is disposed in the sensing chip with fluidic chip 1, specifically, the sample 60 is dropped into the accommodating space 302 of the sensing chip with fluidic device 1. Then, the temperature control unit 15 provides a temperature control signal to heat the sample through the polysilicon layer 402 and controls the width of the temperature control signal to regulate the temperature of the polysilicon layer 402, so the temperature of the sample 60 can be controlled. The temperature of the sample 60 can reach the preset temperature after a heating period, in which the preset temperature range is 50° C.-95° C. In another embodiment, for the biological detection, since the biological target object(s) may be destroyed due to excessive temperature, the preset temperature is 90° C., preferably less than 90° C.

It should be noted that the temperature control unit 15 provides a temperature control signal and controls the width of the temperature control signal to heat the sample, the temperature sensing circuit 17 continuously determine the temperature of the entire sensing chip to control the temperature of the sample 60 and the sensing chip with fluidic device 1 at a fixed temperature. Accordingly, during the sample 60 is heated to a preset temperature, the concentration or amount of the plurality of target objects 602 in the sample 60 may be estimated. Specifically, when the temperature control unit 15 is used to heat the sample 60, the changes of kinetic energy of the plurality of target objects 602 in the sample 60 will change with the increase in temperature, this changes of the kinetic energy may drive the movement or decomposition of the plurality of target objects 602 in the sample 60, so the plurality of target objects 602 in the sample 60 is easily captured by a plurality of receptors 406 on the surface of the metal layer 404. As described in FIG. 1A and FIG. 1B, during the heating process, the voltage value of the metal layer 404 of the second gate electrode 40 may change with the amount of the plurality of target objects 602 captured by the plurality of receptors 406, and the changes of voltage value of the second gate electrode 40 is transmitted to the field effect transistor to convert into the changes of corresponding current value, and then the field effect transistor transmits the changes of corresponding current value to the external processing unit (not shown) for processing. Until the temperature of the sample 60 reaches the preset temperature and the current value does not change, the concentration values of a plurality of target objects 602 in the sample 60 corresponding to the changes of the voltage value of the metal layer 404 at the preset temperature may be obtained.

In the above embodiments of FIG. 1A, FIG. 1B and FIG. 2, in addition to the whole blood or plasma as described above, the sample 60 is a BTP (Bis-Tris Propane) buffer containing an unknown target object(s) concentration. In addition, the metal layer 404 of the second gate electrode 40 may be one or multi-layer(s), and the material of the metal layer 404 and the reference electrode 50 may be an aluminum copper (Al—Cu) alloy.

Figure 3A:
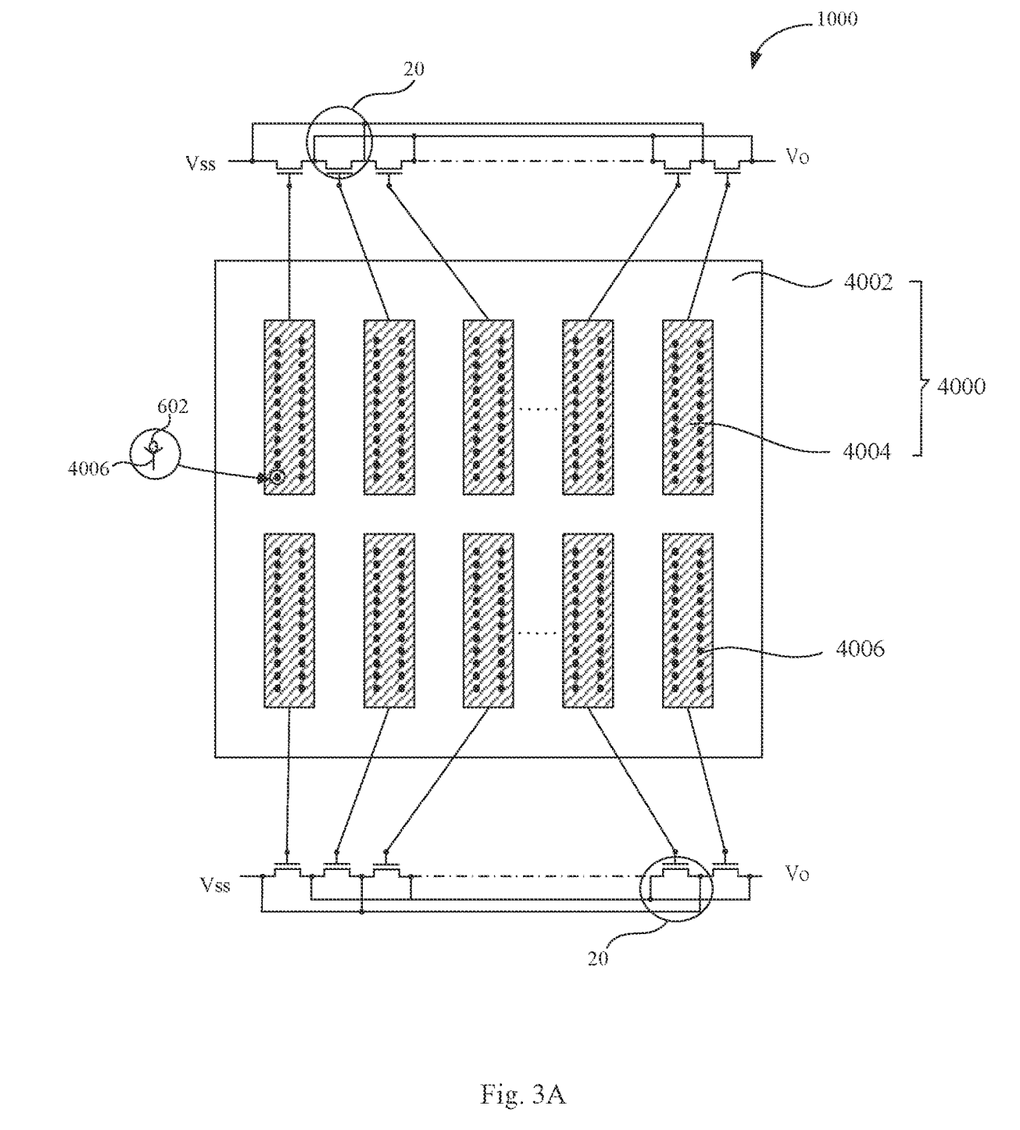
FIG. 3A is a schematic diagram showing another embodiment of a sensing chip with a plurality of fluidic devices in accordance with this invention.

According to the above, the sensing chip with a fluidic device 1 disclosed in this invention can detect the concentration of the plurality of target objects 602 in the sample 60. However, the excessive amount of the plurality of target objects 602 in the sample 60 will induce the insufficient output of the field effect transistor 20. Therefore, to improve the accuracy of the output of the field effect transistor 20, this invention also provides another sensing chip with fluidic device 1000, as shown in FIG. 3A. FIG. 3A is a top view of another embodiment of a sensing chip with a plurality of fluidic devices. In FIG. 3A, the sensing chip with fluidic devices 1000 is also composed of a fluidic device and a field effect transistor 20. The difference from the above sensing chip with fluidic device 1 is that the fluidic device of the sensing chip with fluidic device 1000 in this embodiment also includes an isolation layer (not shown), a second gate electrode 4000, and a reference electrode (not shown). The second gate electrode 4000 is also arranged in the isolation layer with a window (not shown). The structure of the second gate electrode 4000 (not shown) on substrate includes a polysilicon layer 4002 and one or multiple metal layer(s) 4004 thereon. In this embodiment, the polysilicon layer 4002 in the second gate electrode 4000 is a continuous whole layer, the metal layer 4004 is arranged on the polysilicon layer 4002 by sub-area, and each metal layer 4004 is electrically connected with a field effect transistor 20, so the field effect transistor 20 can estimate the output current value in the way of parallel method to obtain the variation of the total output current.

In another embodiment, a sensing element constructed by a plurality of sensing chips with fluidic device a 1000 thereon, and the sensing chip 1000 is also composed of a fluidic device and a field effect transistor 20. The sensing chip with fluidic device is composed of an isolation layer (not shown), a reference electrode (not shown), and a second gate electrode 4000, in which the second gate electrode 4000 is composed of a polysilicon layer 4002 and one or multiple metal layer(s) 4004 thereon. That is, one layer of polysilicon layer 4002 corresponds to one or multiple metal layer(s) 4004. the second gate electrode 4000 of the fluidic device is used to capture and further detect the plurality of target objects 602 in the sample 60. With two different structural designs for the sensing chip with the fluidic device 1000, the sample 60 with a large amount of the plurality of target objects 602 may be detected by sub-area. Similarly, the second gate electrode 4000 in each sensing chip with fluidic device 1000 is electrically connected with one field effect transistor 20, so when each second gate electrode 4000 in the sensing chip with fluidic device 1000 contacts with the sample 60, the changes of voltage value generated by the metal layer 404 of the second gate electrode 4000 will output to the external processing unit (not shown) through the field effect transistor 20 which is connected with the fluidic device, and the variation of the total output current is calculated in parallel method. By using the sub-area detection, it is determined whether there is a target object 602 in the sample 60 in each sub-area, the concentration of the plurality of target object(s) 602 in the sample 60 in one sub-area can also be obtained, so the sum of the concentration per sub-area is the sum of the plurality of target object(s) 602 of the overall sample 60. Accordingly, the detection sensitivity is improved by the sensing elements which includes a plurality of sensing chips with fluidic devices 1000 and output in a parallel method, and the corresponding sample volume of the sample is increased, and the accuracy of the detection result is also increase.

Figure 3B:
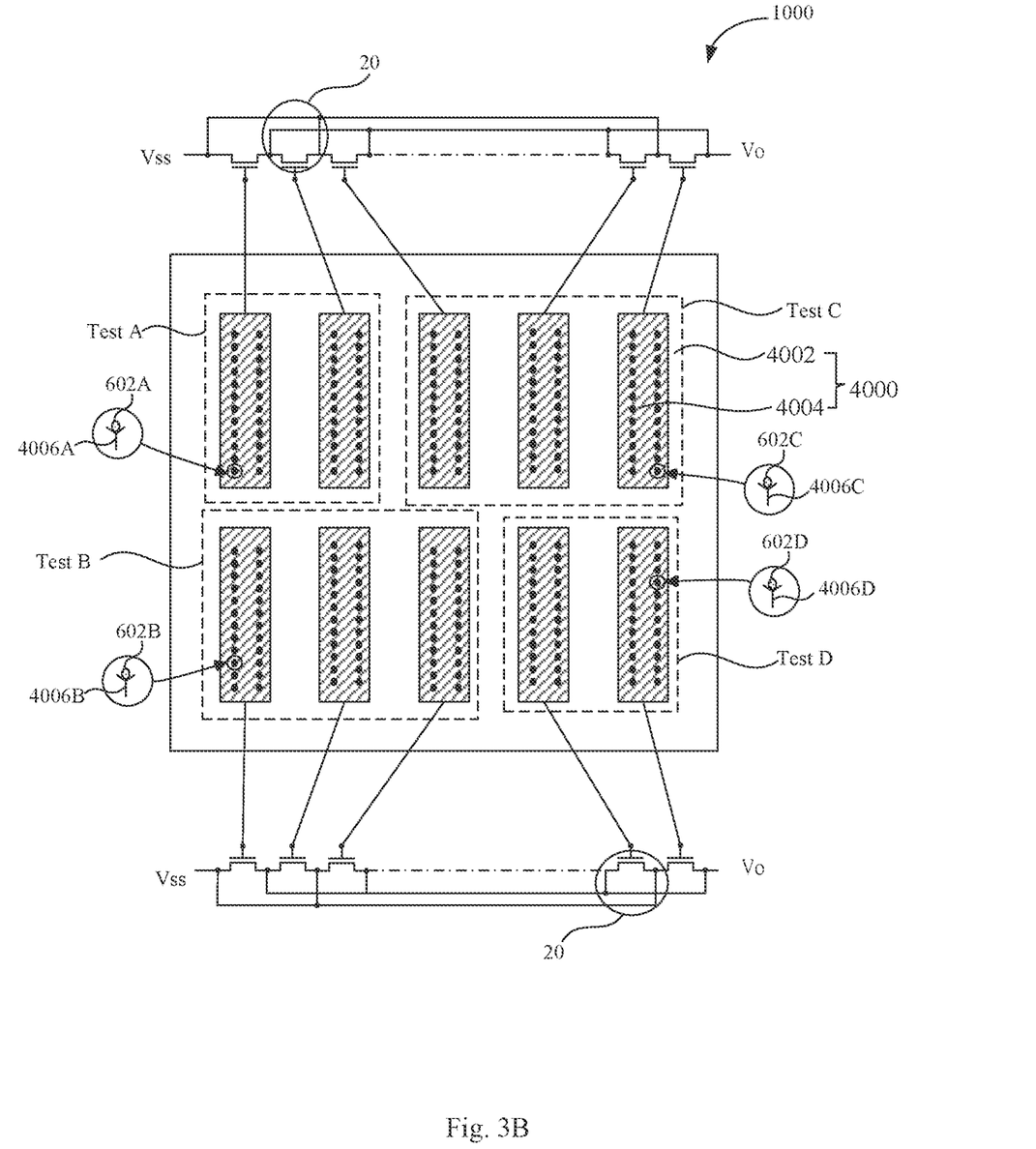
FIG. 3B is a top view showing that sensing elements construct by a plurality of sensing chip to detect different target objects in one sample by sub-area in accordance with this invention.

Next, please refer to FIG. 3B. FIG. 3B shows the sensing element composed of a plurality of sensing chip with fluidic devices, and the plurality of sensing chip with fluidic devices is used to detect the target object(s) in one sample in a way of sub-area. In FIG. 3B, the structure of the sensing element is the same as that in FIG. 3A. Herein, the plurality of sensing chips on the sensing element is divided into four regions, test region A, test region B, test region C, and test region D. In these four regions, the second gate electrode 4000 of the fluidic device of the sensing chip on the same region has the same kinds of the plurality of receptors and the receptors and the second gate electrode 4000 of the fluidic device of the sensing chip on the different regions has the different kinds of the plurality of receptors 406. Accordingly, the receptors in the four regions of the test region A, the test region B, the test region C, and the test region D can express as 4006A, 4006B, 4006C, and 4006D respectively. In this embodiment, the purpose of dividing into different regions are to capture the different kinds of targets 602A, 602B, 602C, and 602D in one sample 60. Similarly, the sample 60 is disposed in the accommodating space 302 of the sensing chip with fluidic device 1 as shown in FIG. 1A and FIG. 1B above. Since the receptors 4006A, the receptors 4006B, the receptors 4006C, and the receptors 4006D in the test region A, the test region B, the test region C, and the test region D are different, the targets 602A, targets 602B, targets 602C, and targets 602D in the sample 60 to be captured sample are also different. Therefore, with the above sensing chip, the different kinds of the receptors 4006A, the receptors 4006B, the receptors 4006C, and the receptors 4006D are set on the metal layer 4004 of the second gate electrode 4000 in the test region A, the test region B, the test region C, and the test region D according to the plurality of targets 602 to be detected. Accordingly, different kinds of targets 602A, targets 602B, targets 602C, and targets 602D can be captured in one sample 60 at the same detection time, to which can greatly save the operation period and manpower.

Figure 4A:
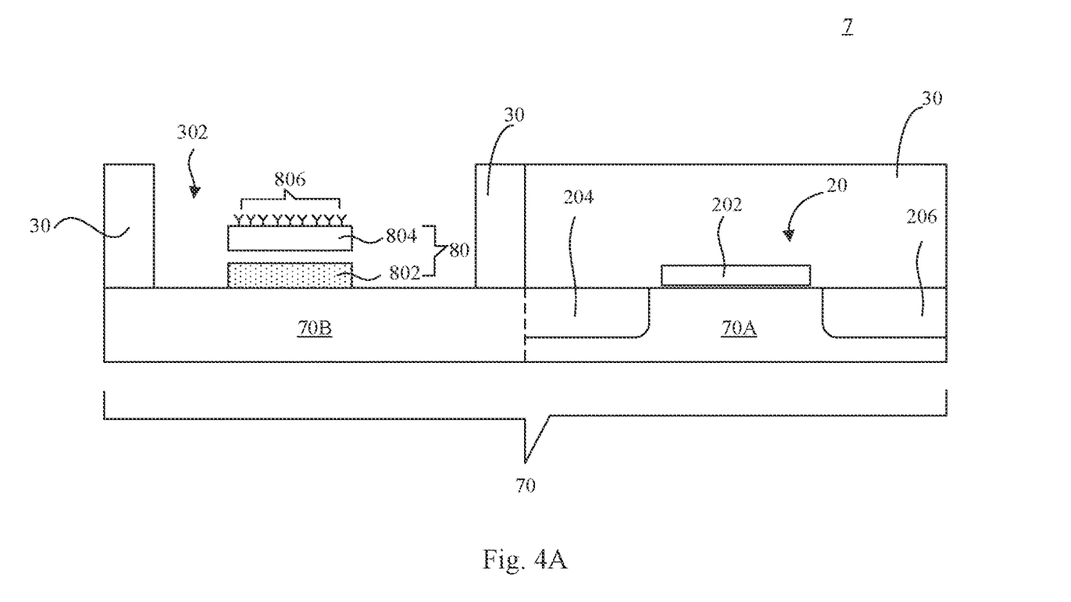
FIG. 4A is a schematic diagram showing another embodiment of a sensing chip with fluidic device in accordance with this invention.

Next, please refer to FIG. 4A. FIG. 4A shows another embodiment of sensing chip with fluidic device. In FIG. 4A, the sensing chip with a fluidic device 7 is also composed of a field effect transistor 20 and a fluidic device 80. The sensing chip with a fluidic device 7 includes a substrate 70, a dotted line on the substrate 70 to divide the substrate 70 into a first area 70A and a second area 70B. A field effect transistor 20 is arranged on the first area 70A of the substrate 70, in which the filed effect transistor 20 may be an n-type metal oxide semiconductor (NMOS). The structure and the formation are the same as that in FIG. 1A, and it is not to be described repeatedly herein. An isolation layer 30 is arranged on the second area 70B of the substrate 70, the isolation layer 30 has a window 302 to expose the surface of the substrate 70 in second area 70B.

The fluidic device is arranged on the second area 70B of the substrate 70 and is electrically connected with the field effect transistor 20, in which the fluidic device includes an isolation layer 30 and a second gate electrode 80. The isolation layer 30 has a window 302 to expose the surface of the substrate 70 in second area 70B, and a region enclosed by the window 302 is an accommodating space. The second gate electrode 80 is arranged in the window 302 of the isolation layer 30. the structure of the second gate electrode 80 on the substrate 70 includes a polysilicon layer 802 and one or multiple metal layer(s) 804 thereon.

In this embodiment, the area enclosed by the window 302 of the isolation layer 30 is used as the accommodating space to accommodate the sample 90 (as shown in FIG. 2B). Therefore, when the sample 90 is disposed in the accommodating space 302, the sample 90 is in contact with the metal layer 804 of the second gate electrode 80 to change the voltage value of the metal layer 804, and the detailed operation will be described later. In this embodiment, the sample 90 is a gas.

Figure 4B:
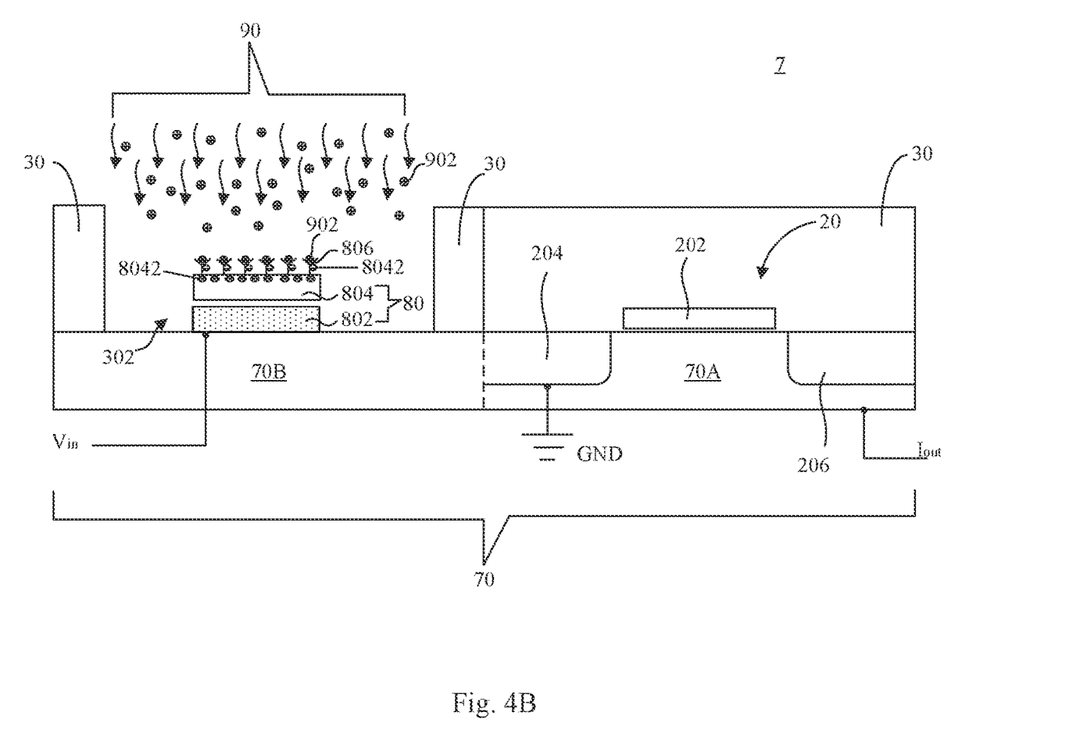
FIG. 4B is a schematic diagram showing the circuit layout of a sensing chip with fluidic device in accordance with this invention.

Next, please refer to FIG. 4B. FIG. 4B shows a layout of the sensing chip with fluidic device. In FIG. 4B, the source electrode 204 of the field effect transistor 20 is grounded, and the drain electrode 206 is connected to an external processing unit (not shown). During the operation, the sensing chip with fluidic device 7 is placed in an environment with the sample 90. After standing for a period, a voltage is applied to the second gate electrode 80, in which the applied voltage is less than 30 volts (V), and the preferred applied voltage ranges from 5-7 volts. Specifically, when the voltage applied to the polysilicon layer 802 of the second gate electrode 80 is positive voltage, a plurality of negative charges 8042 on the surface of the metal layer 404 of the second gate electrode 80 is generated opposite to the electrical polarity of the polysilicon layer 802, so amount of the charges of the negative charges 8042 will be affected by bacteria, viruses, suspended particles or gas molecules with positive charge in the sample 90. Similarly, when the voltage is applied to the polysilicon layer 802 of the second gate electrode 80 is negative voltage, a plurality of positive charges (not shown) on the metal layer 804 of the second gate electrode 80 is generated opposite to the electrical of the polysilicon layer 802, and the positive charges 8042 will be affected by the bacteria, viruses, suspended particles, or gas molecules with negative charge in the sample 90.

For example, when a positive voltage ($V_{in}$) is applied to the polysilicon layer 802 of the second gate electrode 80, a plurality of negative charges is generated on the surface of the metal layer 804 of the second gate electrode 80 and on the plurality of receptors 806, the amount of charges of the negative charges will be affected by the plurality of target objects 902 in the sample 90, such as bacteria, viruses, suspended particles, or gas molecules, The voltage value of the metal layer 804 of the second gate electrode 80 will change with the plurality of targets 902 on the surface of the metal layer 804. The current value generated by the metal layer 804 of the second gate electrode 80 is transmitted to the external processing unit (not shown) through the field effect transistor 20. The concentration value (or amount) of the plurality of target objects 902 in the sample 90 corresponding to the voltage value of the metal layer 804 may be obtained.

In another embodiment, to obtain the concentration of various target objects 902 in the sample 90 under the unit volume, for example, the various target objects 902 may be bacteria, viruses, suspended particles, or gas molecules, and the receptors 806 in the second gate electrode 80 of the sensing chip with fluidic device 7 is changed corresponding to different kinds of targets 902, as described above, the sensing element (not shown) includes the sensing chip with fluidic device 7 arranged in the array that is placed in the detection environment with the sample 90, and a voltage is applied to the second gate electrode 80 of each sensing chip with fluidic device 7 to induce the negative charge(s) (or positive negative(s)) generated on the surface of the metal layer 804 of the second gate electrode 80 of each sensing chip with fluidic device 7, and different kinds of receptors 806 is provided for capturing the various target objects 902. The voltage value generated by the target object(s) captured by each sensing chip with fluidic device 7 in array which is converted by the field effect transistor 20 to generate a corresponding current value, and then the current value is outputted to the external processing unit (not shown) for processing through the field effect transistor 20, so the concentrations of various target objects 902 in the sample 90 may be obtained.

Figure 5:
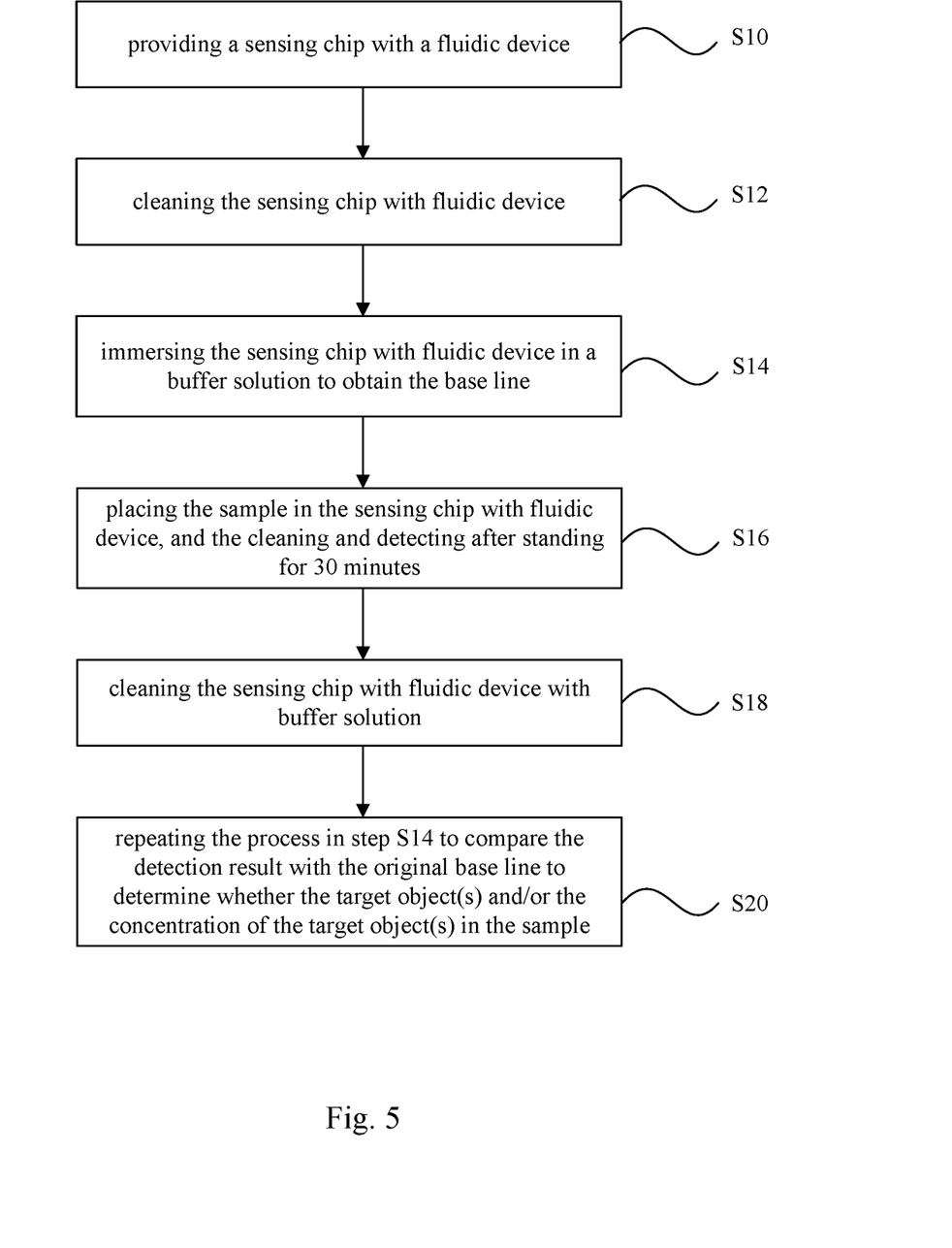
FIG. 5 is a flow chart of a sensing chip with fluidic device for detecting the target object in the sample in accordance with this invention.

Next, please refer to FIG. 5. FIG. 5 shows a flow chart for the detection process of the sensing chip with fluidic device. While disclosing the flow chart of the steps in FIG. 5, the sensing chip with fluidic device 1 of FIG. 1A and FIG. 1B is used as an example for illustration. In FIG. 5, step S10: providing a sensing chip with a fluidic device. Step S12: cleaning the sensing chip with fluidic device. In this step, the sensing chip with fluidic device 1 is cleaned with deionized water to remove some impurities on the sensing chip with fluidic device 1, so the noise may be avoid generating to affect the accuracy of the detection result when detecting the sample 60.

Next, in step S14: immersing the sensing chip with fluidic device in a buffer solution to obtain the base line. In this step, the sensing chip with fluidic device 1 is immersed in the buffer solution. Since there is no target object in the buffer solution, the surface of the metal layer 404 and the plurality of receptors 406 of the second gate electrode 40 of the sensing chip with fluidic device 1 may not affect the voltage value, but the voltage value of the sensing chip with fluidic device 1 after immersed in the buffer solution can be supplied by the reference electrode 50, and then the voltage value is transmitted to the external processing device (not shown) through the field effect transistor 20, in which the above voltage value is a voltage value provided by the reference electrode to the metal layer 404, so the baseline of the drain current and the gate electrode voltage can be obtained, in which the baseline may be provided for comparison with the sample with the target object(s) therein.

In step S16, placing the sample in the sensing chip with fluidic device, and the cleaning and detecting after standing for 30 minutes. In this step, the sample 60 is accommodated in the sensing chip with fluidic device 1 and standing for 30 minutes, the sample 60 can fully contact with the metal layer 404 of the second gate electrode 40 of the sensing chip with fluidic device 1. During standing process, the plurality of receptors 406 on the surface of the metal layer 404 is used to capture the plurality of targets 602 in the sample 60. As mentioned above, after the plurality of the receptors 406 captures the plurality of target objects 602, it may cause the voltage value of the metal layer 404 to change in the subsequent step 20.

Next, step S18: cleaning the sensing chip with fluidic device with buffer solution. In this step, the sensing chip with fluidic device is immersed in the buffer solution in step S16 is cleaned with a new buffer solution. For the detection accuracy, a cleaning step is required for the sensing chip with fluidic device 1.

Step S20: repeating the process in step S14 to compare the detection result with the original base line to determine whether the target object(s) and/or the concentration of the target object(s) in the sample. In this step, the detection result obtained in step 14 is compared with the base line. In addition to determine whether the target object(s) 602 in the sample 60 by the changes of the voltage value, the voltage value is also used to estimate the concentration of the target object(s) 602 in the sample 60.

Figure 6:
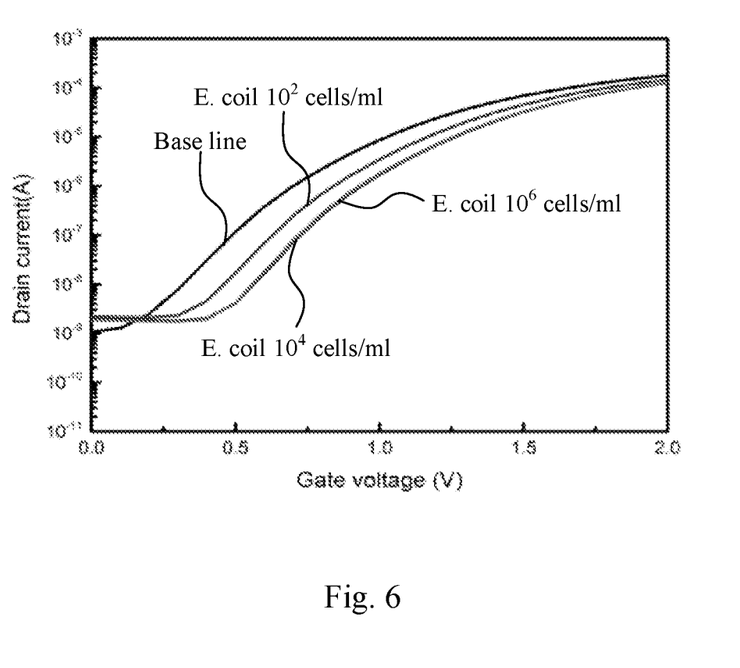
FIG. 6 is a schematic diagram showing that a sensing chip with fluidic device detects a sample with *E. coli* in accordance with this invention.

Based on the above steps, FIG. 6 is a schematic diagram showing the comparison between the baseline and the sample containing three different concentrations of *Escherichia coli* (*E. coli*). In FIG. 6, the baseline is obtained by using a buffer solution. Then, according to the above step S18 to step S20, the sample of *E. coli* with different concentrations are respectively disposed in the sensing chip with fluidic device 1 for detection, in which the concentrations of *E. coli* are 102 cells/ml, 104 cells/ml and 106 cells/ml respectively. In addition to the fact that the sensing chip with fluidic device 1 can detect *E. coli* in the sample from FIG. 6, it can also be obtained that under the condition of the same voltage value, the concentration for the different *E. coli* is higher, the changes of the current value of the metal layer 404 of the second gate electrode 40 of the sensing chip with fluidic device 1 is also different.

In view of above, in addition to the sensing chips with fluidic device 1, 7, and 1000 disclosed in this invention may detect the state of sample 60 in the form of liquid state or gas state, the concentrations of the target objects 602, target objects 602A, target objects 602B, target objects 602C, and/or target objects 602D in the sample 60, which is not only to detect the existence of the target objects 602, target objects 602A, target objects 602B, target objects 602C, and/or target objects 602D in the sample 60, but also to obtain the concentrations of the target objects 602, target objects 602A, target objects 602B, target objects 602C, and/or target objects 602D. Accordingly, the obtained results can provide to subsequent relevant personnel for research or judgment, so as to solve the technical problem that the sensing chip of the prior art can only detect the existence of the plurality of targets, but cannot detect for the amount of the target object.

In addition, in the embodiment of this invention, the second gates electrode 40, 80, and 4000 in the sensing chips with fluidic device 1, 7, and 1000 can be compatible with the current standard CMOS (complex metal oxide semiconductor) semiconductor process. Therefore, the wafer factory does not need other special or customized processes to complete the semiconductor process, which solves the technical problem that the sensing chip needs special processes in the prior art.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation, so as to encompass all such modifications and similar structures.

What is claimed is:

1. A sensing chip with a fluidic device, comprising:
   a field effect transistor is arranged on the first area of the substrate, the field effect transistor having a first gate electrode, a source electrode, and a drain electrode, and the first gate electrode is arranged between the source electrode and the drain electrode and is disposed on the substrate; and
   a fluidic device is arranged on the second area of the substrate and is electrically connected with the field effect transistor, the fluidic device comprises:
      an isolation layer having a window to expose a surface of the substrate in the second area, and a region enclosed by the window is an accommodating space;
      a second gate electrode is arranged in the window of the isolation layer and the structure of second gate electrode on the substrate includes a polysilicon layer and one or multiple metal layers thereon;
      a plurality of receptors on a surface of the one or multiple metal layers is provided for capturing a plurality of target objects in a sample; and
      a reference electrode is disposed on the second area of the substrate and adjacent to the second gate electrode, and the reference electrode is in contact with the sample, and is used to provide a voltage required for measuring changes of voltage value of the one or multiple metal layer of the second gate electrode.

2. The sensing chip with a fluidic device according to claim 1, wherein the sample is disposed in the accommodating space in contact with the one or multiple metal layers of the second gate electrode, a voltage value of the one or multiple metal layers of the second gate electrode is changed with the amount of the plurality of target objects captured by the plurality of receptors, and the changes of voltage value is converted into a corresponding changes of current value and is transmitted to an external processing unit through the field effect transistor.

3. The sensing chip with a fluidic device according to claim 2, wherein the external processing unit is provided for processing the changes of current value to obtain a concentration value of the plurality of target objects in the sample corresponding to the changes of voltage value of the one or multiple metal layers.

4. A sensing chip with a fluidic device, comprising:
a substrate having a first area and a second area;
a field effect transistor is arranged on the first area of the substrate, the field effect transistor having a first gate electrode, a source electrode, and a drain electrode, and the first gate electrode is arranged between the source electrode and the drain electrode and is disposed on the substrate; and
a fluidic device is arranged on the second area of the substrate and is electrically connected with the field effect transistor, the fluidic device comprises:
an isolation layer having a window to expose a surface of the substrate in the second area, and a region enclosed by the window is an accommodating space;
a second gate electrode is arranged in the window of the isolation layer and the structure of the second gate electrode on the substrate includes a polysilicon layer and one or multiple metal layers thereon;
a plurality of receptors on a surface of one or multiple metal layer of the second gate electrode is configured to capture a plurality of target objects in a sample; and
a reference electrode adjacent to the second gate electrode and is arranged on the second area of the substrate, and the reference electrode is in contact with the sample,
wherein the sample is disposed in the accommodating space, the one or multiple metal layers of the second gate electrode is in contact with the sample, one end of the polysilicon layer of the second gate electrode is grounded and the other end of the polysilicon layer is electrically connected with a temperature control unit to regulate a temperature of the sample.

5. The sensing chip with fluidic device according to claim 4, wherein the temperature control unit is provided for providing a temperature control signal to heat the sample in the accommodating space through the polysilicon layer.

6. The sensing chip with fluidic device according to claim 5, wherein when a heating temperature of the sample reaches a preset temperature, a plurality of receptors on a surface of the one or multiple metal layers is provided for capturing the plurality of target objects in the sample, a voltage value of the one or multiple metal layers of the second gate electrode is changed with the amount of plurality of target objects captured by the plurality of receptors, and the field effect transistor converts the changes of the voltage value into a corresponding changes of current value and transmits to an external processing unit.

7. The sensing chip with fluidic device according to claim 6, wherein the external processing unit is provided for processing the corresponding changes of current value to obtain a concentration value of the plurality of target objects in the sample.

8. The sensing chip with a fluidic device according to claim 7, wherein the preset temperature range is 50° C.-95° C.

9. The sensing chip with a fluidic device according to claim 4, wherein the temperature control unit is a pulse width modulation unit (PWM).

10. A sensing chip with a fluidic device, comprising:
a substrate having a first area and a second area;
a field effect transistor is arranged in the first area of the substrate, the field effect transistor having a first gate electrode, a source electrode, and a drain electrode, and the first gate electrode is arranged between the source electrode and the drain electrode and is disposed on the substrate; and
a fluidic device is arranged in the second area of the substrate and is electrically connected with the field effect transistor, the fluidic device comprises:
an isolation layer having a window to expose a surface of the substrate in the second area, and a region enclosed by the window is an accommodating space; and
a second gate electrode is arranged in the window of the isolation layer and the structure of the second gate electrode on substrate includes a polysilicon layer and one or multiple metal layers thereon; and
a plurality of receptors on a surface of the one or multiple metal layers of the second gate electrode is configured to capture the plurality of target objects in a sample;
wherein when the sensing chip with the fluidic device is placed in an environment with the sample, the sample is in contact with the second gate electrode, a voltage is applied to the second gate electrode, a plurality of charges will be generated on the surface of the metal layer of the second gate electrode, and the amount of electrical charge of each the plurality of charges on the metal layer is affected by a target object in the sample, and a voltage value of the metal layer of the second gate electrode will change with amount of the plurality of target objects captured by the plurality of receptors, and the second gate electrode is provided for transmitting the voltage value of the metal layer to an external processing unit through the field effect transistor to process the voltage and current value.

11. The sensing chip with fluidic device according to claim 10, wherein the target object is bacteria, viruses, suspended particles, or gas molecules.

12. The sensing chip with a fluidic device according to claim 10, wherein the sensing chip with the fluidic device is detected by a sub-area and an output current is connected in parallel method to estimate the change value of the total output current.

13. The sensing chip with fluidic device according to claim 10, wherein the voltage applied to the second gate electrode is less than 30 volts.

14. The sensing chip with fluidic device according to claim 10, wherein the sample is gas.

* * * * *